United States Patent
Takeda

(10) Patent No.: US 12,232,454 B2
(45) Date of Patent: Feb. 25, 2025

(54) TECHNIQUE FOR CONTROLLING BRUSHLESS DC MOTOR OF ELECTRIC WORK MACHINE

(71) Applicant: MAKITA CORPORATION, Anjo (JP)

(72) Inventor: Kouichi Takeda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 281 days.

(21) Appl. No.: 17/892,656

(22) Filed: Aug. 22, 2022

(65) Prior Publication Data

US 2023/0065201 A1 Mar. 2, 2023

(30) Foreign Application Priority Data

Aug. 25, 2021 (JP) .................. 2021-137224

(51) Int. Cl.
*A01G 20/47* (2018.01)
*H02K 11/33* (2016.01)

(52) U.S. Cl.
CPC ............. *A01G 20/47* (2018.02); *H02K 11/33* (2016.01)

(58) Field of Classification Search
CPC ... H02K 11/33; H02P 1/00; H02P 1/18; H02P 1/42; H02P 3/24; H02P 6/06; H02P 6/08; H02P 6/085; H02P 6/16; H02P 6/17; H02P 6/28; H02P 7/245; H02P 7/265; H02P 7/29; H02P 25/03; H02P 25/00; H02P 25/062; H02P 25/064; H02P 25/0805; H02P 27/06; H02P 27/08; H02P 29/68; H02P 29/045; H02P 6/15; H02P 29/60; A01G 20/47
See application file for complete search history.

(56) References Cited

U.S. PATENT DOCUMENTS

| 5,789,893 A * | 8/1998 | Watkins .................. H02P 25/08 318/400.11 |
| 2017/0163183 A1 | 6/2017 | Gao et al. |
| 2018/0080453 A1 | 3/2018 | Yamamoto et al. |
| 2021/0234492 A1 | 7/2021 | Trump et al. |

FOREIGN PATENT DOCUMENTS

| JP | 2000-245188 A | 9/2000 |
| JP | 2003-219674 A | 7/2003 |
| JP | 2003-259678 A | 9/2003 |
| JP | 2016-078230 A | 5/2016 |
| JP | 2017-127182 A | 7/2017 |
| JP | 2018058143 A | 4/2018 |
| JP | 6491025 B2 | 3/2019 |

OTHER PUBLICATIONS

Oct. 29, 2024 Notice of Reasons for Refusal issued in Japanese Patent Application No. 2021-137224.

* cited by examiner

Primary Examiner — Antony M Paul
(74) Attorney, Agent, or Firm — Oliff PLC

(57) ABSTRACT

An electric work machine in one aspect of the present disclosure includes an output shaft, a brushless DC motor, a first positive-side conduction path, a first negative-side conduction path, a first switch device, a manual switch, a rotation sensor, and a controller. The first switch device is on the first positive-side conduction path or the first negative-side conduction path. The controller controls a magnitude of a conduction angle based on an actual rotational frequency and a target rotational frequency of the brushless DC motor.

18 Claims, 13 Drawing Sheets

TECHNIQUE FOR CONTROLLING BRUSHLESS DC MOTOR OF ELECTRIC WORK MACHINE

CROSS-REFERENCE TO RELATED APPLICATIONS

The present application claims the benefit of Japanese patent application No. 2021-137224 filed with the Japan Patent Office on Aug. 25, 2021 and the entire disclosure of which is incorporated herein by reference.

BACKGROUND

The present disclosure relates to an electric work machine including a brushless DC motor.

Japanese Patent No. 6491025 discloses a backpack-type blower.

This blower includes first to sixth switch devices. The first to third switch devices are, as high side switches, connected to a positive electrode of a DC power source and to three terminals of the brushless DC motor. The fourth to the sixth switch devices are, as low-side switches, connected to a negative electrode of the DC power source and to the three terminals of the brushless DC motor. The first through sixth switch devices are driven with pulse-width modulated (PWM) signals.

SUMMARY

In the above-described backpack-type blower, in a case where respective conduction angles of the first to sixth switch devices has a fixed magnitude of 120 degrees, the first to sixth switch devices may cause a large power loss when being driven with a high duty ratio in order to control a rotational frequency of the brushless DC motor receiving a high load to reach a target rotational frequency. Such power loss may cause a large amount of heat in the first to sixth switch devices.

In one aspect of the present disclosure, it is preferable in an electric work machine to rotate a brushless DC motor at a target rotational frequency while inhibiting the generation of heat in a switch device due to a power loss in the switch device.

One aspect of the present disclosure provides an electric work machine including an output shaft, a brushless DC motor, a first positive-side conduction path, a first negative-side conduction path, a first switch device, a manual switch, a rotation sensor, and a controller.

The output shaft is attached to or configured to be attached to a driven equipment. The brushless DC motor includes a rotor, a first terminal, and a second terminal. The brushless DC motor rotationally drives the output shaft. The first terminal and the second terminal draw a drive current into the brushless DC motor and draw the drive current from the brushless DC motor to rotate the brushless DC motor. The first positive-side conduction path electrically connects a positive electrode of a DC power source to the first terminal to deliver the drive current from the positive electrode to the first terminal. The first negative-side conduction path electrically connects a negative electrode of the DC power source to the second terminal to deliver the drive current to the negative electrode from the second terminal. The first switch device is on the first positive-side conduction path or the first negative-side conduction path. The first switch device completes or interrupts the first positive-side conduction path or the first negative-side conduction path. The manual switch receives a manual operation from a user of the electric work machine and generates an input signal. The input signal indicates an input variable. The input variable varies according to the manual operation. The rotation sensor outputs a rotation angle signal corresponding to a rotation angle of the rotor.

The controller sets a target rotational frequency of the brushless DC motor based on the input variable. The controller detects (i) the rotation angle of the rotor and (ii) an actual rotational frequency of the brushless DC motor based on the rotation angle signal. The controller drives the first switch device while the rotation angle of the rotor is within a conduction angle. The controller controls a magnitude of the conduction angle based on the actual rotational frequency and the target rotational frequency.

In the above-described electric work machine, the magnitude of the conduction angle is controlled based on the actual rotational frequency and the target rotational frequency of the brushless DC motor, whereby a power loss in the first switch device can be reduced.

Therefore, in the above-described electric work machine, the brushless DC motor can be rotated at the target rotational frequency while inhibiting the generation of heat in the first switch device due to the power loss in the first switch device.

Another aspect of the present disclosure provides a method of controlling a brushless DC motor of an electric work machine. The method includes:

- detecting (i) a rotation angle of a rotor of the brushless DC motor and (ii) an actual rotational frequency of the brushless DC motor;
- driving a switch device of the electric work machine while the rotation angle of the rotor is within a conduction angle; and
- controlling a magnitude of the conduction angle based on the actual rotational frequency and a target rotational frequency.

With this method, it is possible in an electric work machine to rotate the brushless DC motor at the target rotational frequency while inhibiting the generation of heat in the switch device due to a power loss in the switch device.

BRIEF DESCRIPTION OF THE DRAWINGS

Some example embodiments of the present disclosure will be described hereinafter by way of example with reference to the accompanying drawings, in which.

DETAILED DESCRIPTION OF EXEMPLARY EMBODIMENTS

1. Overview of Embodiments

Figure 1:
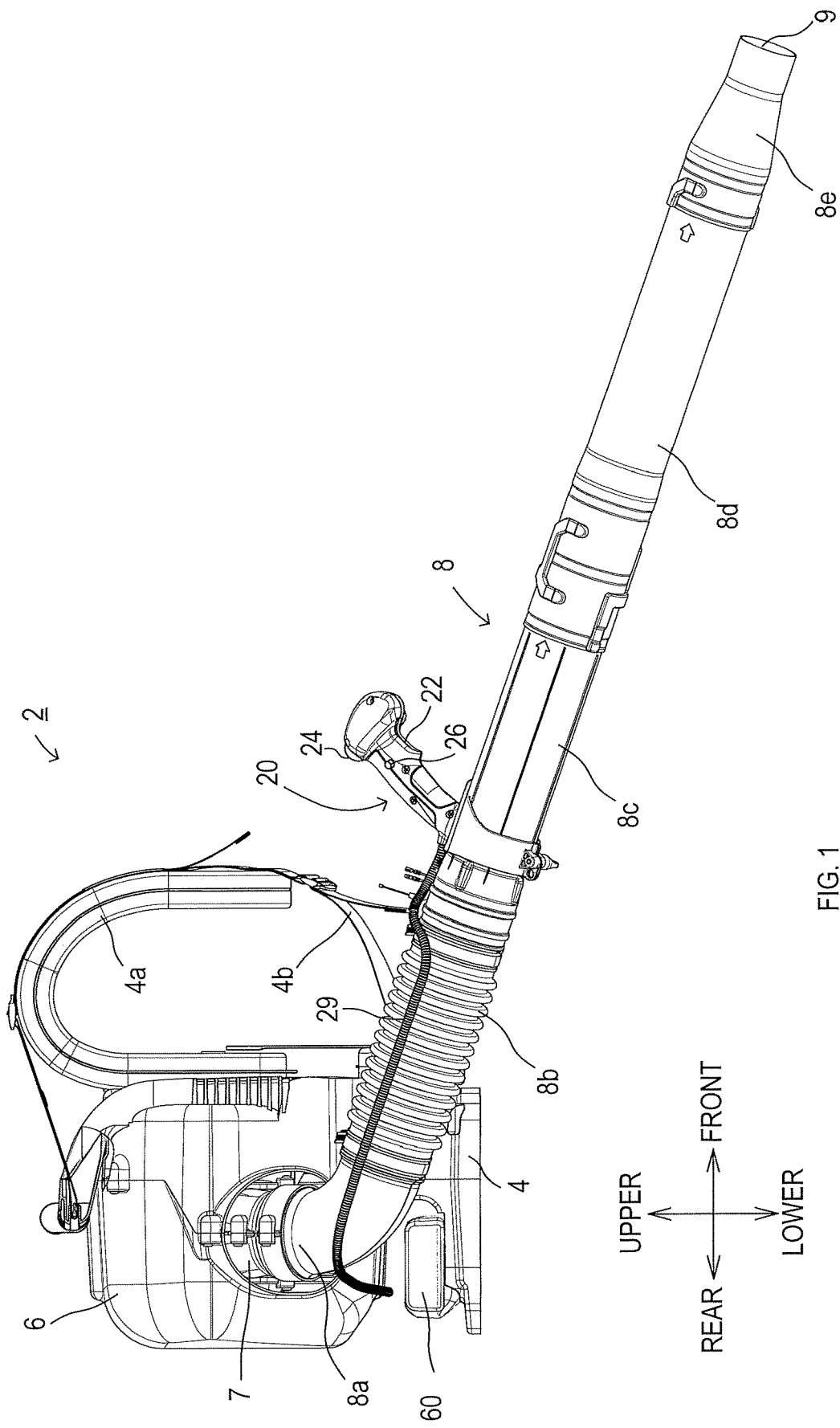
FIG. 1 is a right side view of a backpack-type blower according to a first embodiment.

One embodiment may provide an electric work machine including at least any one of the following features 1 through 15.

Feature 1: an output shaft attached to or configured to be attached to a driven equipment (or a driven tool).

Feature 2: a brushless DC motor (i) including a rotor, a first terminal, and a second terminal and (ii) configured to rotationally drive the output shaft.

Feature 3: the first terminal and the second terminal are configured to draw (or input, or feed) a drive current into the brushless DC motor and draw (or output) the drive current from the brushless DC motor to rotate the brushless DC motor.

Feature 4: a first positive-side conduction path configured to electrically connect a positive electrode of a DC power source to the first terminal to deliver the drive current from the positive electrode to the first terminal.

Feature 5: a first negative-side conduction path configured to electrically connect a negative electrode of the DC power source to the second terminal to deliver the drive current to the negative electrode from the second terminal.

Feature 6: a first switch device (i) on the first positive-side conduction path or the first negative-side conduction path and (ii) configured to complete or interrupt the first positive-side conduction path or the first negative-side conduction path.

Feature 7: a manual switch configured to (i) receive a manual operation from a user of the electric work machine and (ii) generate an input signal.

Feature 8: the input signal indicates an input variable.

Feature 9: the input variable varies according to the manual operation.

Feature 10: a rotation sensor configured to output a rotation angle signal corresponding to a rotation angle of the rotor.

Feature 11: a controller.

Feature 12: the controller is configured to set a target rotational frequency (or a target rotational speed, or a desired rotational frequency, or a desired rotational speed) of the brushless DC motor based on the input variable.

Feature 13: the controller is configured to detect (i) the rotation angle of the rotor and (ii) an actual rotational frequency (or an actual rotational speed) of the brushless DC motor based on the rotation angle signal.

Feature 14: the controller is configured to drive the first switch device while the rotation angle of the rotor is within a conduction angle (or an excitation angle or a firing angle).

Feature 15: the controller is configured to control (or adjust, or change, or vary, or increase and decrease) a magnitude of the conduction angle based on the actual rotational frequency and the target rotational frequency.

In the electric work machine including at least the features 1 through 15, the magnitude of the conduction angle is controlled based on the actual rotational frequency and the target rotational frequency of the brushless DC motor, whereby the power loss in the first switch device can be reduced.

Therefore, in such an electric work machine, the brushless DC motor can be rotated at the target rotational frequency while inhibiting the generation of heat in the first switch device due to the power loss in the first switch device.

One embodiment may include the following feature 16 in addition to or in place of at least any one of the features 1 through 15.

Feature 16: the controller is configured to output a pulse width modulated signal to the first switch device while the rotation angle of the rotor is within the conduction angle.

In the electric work machine including at least the features 1 through 16, the first switch device can be driven with the pulse width modulated signal.

One embodiment may include the following feature 17 and/or feature 18 in addition to or in place of at least any one of the features 1 through 16.

Feature 17: the controller is configured to set a target duty ratio (or a desired duty ratio) of the pulse width modulated signal based on the input variable.

Feature 18: the controller is configured to set an actual duty ratio of the pulse width modulated signal based on the target duty ratio.

In the electric work machine including at least the features 1 through 18, the first switch device, and thus, the brushless DC motor can be controlled based on the manual operation.

One embodiment may include the following feature 19 in addition to or in place of at least any one of the features 1 through 18.

Feature 19: the controller is configured to increase the target rotational frequency and the target duty ratio in accordance with an increase in the input variable.

In the electric work machine including at least the features 1 through 19, the target rotational frequency and the target duty ratio can be increased in response to the manual operation increasing the input variable.

One embodiment may include the following feature 20 and/or feature 21 in addition to or in place of at least any one of the features 1 through 19.

Feature 20: the manual switch is configured to be moved by the user.

Feature 21: the input variable increases in accordance with an increase in a movement of the manual switch.

In the electric work machine including at least the features 1 through 21, the target rotational frequency and the target duty ratio can be increased in association with the movement of the manual switch.

One embodiment may include the following feature 22 and/or feature 23 in addition to or in place of at least any one of the features 1 through 21.

Feature 22: the controller is configured to increase the target duty ratio in accordance with an increase in a manually operated parameter while the manually operated parameter is less than a threshold.

Feature 23: the manually operated parameter varies based on the input variable.

In the electric work machine including at least the features 1 through 19, 22 and 23, while the manually operated parameter is less than the threshold, the manually operated parameter is increased through the manual operation, and the target duty ratio can be increased.

One embodiment may include the following feature 24 and/or feature 25 in addition to or in place of at least any one of the features 1 through 23.

Feature 24: the controller is configured to set the target duty ratio to 100% while a manually operated parameter is equal to or more than a threshold.

Feature 25: the manually operated parameter varies based on the input variable.

In the electric work machine including at least the features 1 through 19, 24 and 25, while the manually operated parameter is equal to or more than the threshold, the target duty ratio can be set to 100%.

One embodiment may include the following feature 26 in addition to or in place of at least any one of the features 1 through 25.

Feature 26: the controller is configured to gradually increase the actual duty ratio to the target duty ratio.

In the electric work machine including at least the features 1 through 19 and 26, the actual duty ratio is gradually increased to the target duty ratio and an magnitude of the drive current is gradually increased. As a result, at the time of the start of driving the brushless DC motor, an inrush current can be inhibited from flowing into the brushless DC motor.

One embodiment may include the following feature 27 and/or feature 28 in addition to or in place of at least any one of the features 1 through 26.

Feature 27: the controller is configured to set an initial value of a target duty ratio of the pulse width modulated signal to 100% in response to the manual switch being manually operated or having been manually operated.

Feature 28: the controller is configured to set an actual duty ratio of the pulse width modulated signal based on the target duty ratio.

In the electric work machine including at least the features 1 through 16, 27 and 28, immediately after the manual switch is manually operated, the target duty ratio is set to 100% regardless of the input variable. As a result, since the first switch device is maintained in an ON-state at regular intervals, the generation of heat in the first switch device due to the power loss in the first switch device can be more effectively inhibited.

One embodiment may include the following feature 29 in addition to or in place of at least any one of the features 1 through 28.

Feature 29: the controller is configured to control the magnitude of the conduction angle while the rotor is rotating by a preset angle.

In the electric work machine including at least the features 1 through 15 and 29, the magnitude of the conduction angle can be controlled while the rotor is rotating by the preset angle.

One embodiment may include at least any one of the following features 30 through 32 in addition to or in place of at least any one of the features 1 through 29.

Feature 30: the controller is configured to increase the magnitude of the conduction angle to an upper limit of the magnitude until the actual rotational frequency reaches the target rotational frequency.

Feature 31: the controller is configured to reduce the magnitude of the conduction angle in response to the actual rotational frequency having reached the target rotational frequency.

Feature 32: the controller is configured to maintain the actual rotational frequency at the target rotational frequency.

In the electric work machine including at least the features 1 through 15, and 30 through 32, the actual rotational frequency can promptly reach the target rotational frequency and can be maintained at the target rotational frequency.

One embodiment may include the following feature 33 in addition to or in place of at least any one of the features 1 through 32.

Feature 33: a second switch device (i) on the first positive-side conduction path without the first switch device and configured to complete or interrupt the first positive-side conduction path, or (ii) on the first negative-side conduction path without the first switch device and configured to complete or interrupt the first negative-side conduction path.

In the electric work machine including at least the features 1 through 15, and 33, the brushless DC motor can be driven through the first switch device and the second switch device.

One embodiment may include the following feature 34 in addition to or in place of at least any one of the features 1 through 33.

Feature 34: the controller is configured to drive the first switch device and the second switch device while the rotation angle of the rotor is within the conduction angle.

In the electric work machine including at least the features 1 through 15, 33 and 34, the first switch device and the second switch device can be driven during the conduction angle.

One embodiment may include at least any one of the following features 35 through 37 in addition to or in place of at least any one of the features 1 through 34.

Feature 35: the manual switch includes a trigger configured to be pulled by the user.

Feature 36: the manual switch includes a rotary dial configured to be rotated by the user.

Feature 37: the input variable varies according to a pulled distance of the trigger (or a position of the trigger, a moved length/moved angle of the trigger) and/or a rotation angle of the rotary dial.

One embodiment may include the following feature 38 in addition to or in place of at least any one of the features 1 through 37.

Feature 38: the controller is configured to set the target rotational frequency based on (i) the pulled distance of the trigger and/or (ii) the rotation angle of the rotary dial.

In the electric work machine including at least the features 1 through 15, 35, 37 and 38, the target rotational frequency can be set based on the pulled distance of the trigger.

In the electric work machine including at least the features 1 through 15 and 36 through 38, the target rotational frequency can be set based on the rotation angle of the rotary dial.

One embodiment may include at least any one of the following features 39 through 41 in addition to or in place of at least any one of the features 1 through 38.

Feature 39: the controller is configured to output a pulse width modulated signal to the first switch device while the rotation angle of the rotor is within the conduction angle.

Feature 40: the controller is configured to set a target duty ratio of the pulse width modulated signal based on (i) the pulled distance of the trigger and/or (ii) the rotation angle of the rotary dial.

Feature 41: the controller is configured to set an actual duty ratio of the pulse width modulated signal based on the target duty ratio.

In the electric work machine including at least the features 1 through 15, 35 and 37 through 41, the target duty ratio, and furthermore, the actual duty ratio can be set based on the pulled distance of the trigger.

In the electric work machine including at least the features 1 through 15 and 36 through 41, the target duty ratio, and furthermore, the actual duty ratio can be set based on the rotation angle of the rotary dial.

One embodiment may include the following feature 42 in addition to or in place of at least any one of the features 1 through 41.

Feature 42: the brushless DC motor is in the form of a three-phase brushless DC motor.

In the electric work machine including at least the features 1 through 15 and 42, the three-phase brushless DC motor can be rotated at the target rotational frequency while inhibiting the generation of heat in the first switch device due to the power loss in the first switch device.

In one embodiment, the controller may be integrated into a single electronic unit, a single electronic device, or a single circuit board.

In one embodiment, the controller may be a combination of two or more electronic circuits, two or more electronic units, or two or more electronic devices individually provided on or in the electric work machine.

In one embodiment, the first positive-side conduction path, the first negative-side conduction path and/or the first switch device may be provided on the controller.

In one embodiment, the manual switch may be in the form of a keyboard, a touch panel, a touchscreen, or a Graphical User Interface (GUI).

One embodiment may provide a method of controlling a brushless DC motor of an electric work machine, and the method includes at least any one of the following features 43 through 45, Feature 43: detecting (i) a rotation angle of a rotor of the brushless DC motor and (ii) an actual rotational frequency of the brushless DC motor.

Feature 44: driving a switch device of the electric work machine while the rotation angle of the rotor is within a conduction angle.

Feature 45: controlling a magnitude of the conduction angle based on the actual rotational frequency and a target rotational frequency.

With the method including the features 43 through 45, it is possible to rotate the brushless DC motor at the target rotational frequency while inhibiting the generation of heat in the switch device due to the power loss in the switch device.

In one embodiment, the above-described features 1 through 45 may be combined in any way.

In one embodiment, at least any one of the above-described features 1 through 45 may be excluded.

Examples of the electric work machine may include various electric work machines used in job sites (or work sites), such as do-it-yourself carpentry, manufacturing, gardening, and construction, and specifically include electric power tools for masonry work, metalworking, and woodworking, work machines for gardening, and devices for preparing an environment of job sites, and more specifically include electric blowers, electric hammers, electric hammer drills, electric drills, electric drivers, electric wrenches, electric grinders, electric circular saws, electric reciprocating saws, electric jig saws, electric cutters, electric chain saws, electric planes, electric nailing machines (including tackers), electric hedge trimmers, electric lawn mowers, electric lawn trimmers, electric bush/grass cutters, electric cleaners, electric sprayers, electric spreaders, electric dust collectors (or electric dust extractors), and battery-powered wheel barrows (or battery-powered dollies or battery-powered hand trucks).

2. Specific Example Embodiments

Hereinafter, specific example embodiments will be described.

2-1. First Embodiment

2-1-1. Schematic Structure

As shown in FIG. 1, an electric work machine in this first embodiment is in the form of a backpack-type blower 2. This blower 2 includes a back carrier 4. This back carrier 4 includes shoulder pads 4a and belts 4b attached to the back carrier 4. The shoulder pads 4a are configured to hang over the shoulder of a user of the blower 2. The belts 4b are attached to the respective shoulder pads 4a and configured to be adjustable in their lengths so that the back carrier 4 fits for the user's upper body.

The blower 2 includes a blower main body 6 on the back carrier 4. The blower main body 6 is fixed to the back carrier 4 through a not-shown spring for vibration absorption. The blower main body 6 includes a battery pack 60 in the lower part thereof. The battery pack 60 is detachably attached to the back carrier 4. The blower main body 6 includes a pipe attachment portion 7. The pipe attachment portion 7 is located on the right side of the user when the user carries the back carrier 4 on the back. The pipe attachment portion 7 includes a pipe assembly 8 attached to the pipe attachment portion 7. The pipe attachment portion 7 collects air supplied from the inside of the blower main body 6 and delivers it to the pipe assembly 8.

The pipe assembly 8 is configured to guide the airflow discharged from the inside of the blower main body 6 to a discharge port 9 on the leading end of the pipe assembly 8. More specifically, the pipe assembly 8 includes first through fifth partial pipes 8a through 8e divided along the longitudinal axis of the pipe assembly 8. The first partial pipe 8a is detachably attached to the pipe attachment portion 7. The first partial pipe 8a is formed in an L-shape so that the direction of the airflow discharged from the blower main body 6 can be changed from the user's side to the front.

The second partial pipe 8b is formed into a bellows shape so that the direction of the discharge port 9 can be changed as desired, and is connected to the first partial pipe 8a. The third partial pipe 8c is formed into a linear shape and is connected to the second partial pipe 8b.

The third partial pipe 8c is configured to be connected to the fourth partial pipe 8d or the fifth partial pipe 8e. The fourth partial pipe 8d is formed into a linear shape. The fifth partial pipe 8e includes the discharge port 9 on the leading end thereof. The discharge port 9 has a diameter smaller than that of the rear end of the fifth partial pipe 8e. The fifth partial pipe 8e can also be connected to the leading end of the fourth partial pipe 8d.

The third partial pipe 8c includes a handle 20 on the circumference thereof. The handle 20 is configured to be gripped by the user. With the handle 20, the user can adjust the direction of the discharge port 9. The handle 20 in this first embodiment can slide on the third partial pipe 8c along the longitudinal axis of the third partial pipe 8c and can be fixed in a desired position. The handle 20 is connected to an electric cable 29 held on the pipe assembly 8.

The handle 20 in this first embodiment includes a trigger 22, a rotary dial 24 and a lock button 26. The trigger 22, the rotary dial 24 and the lock button 26 are arranged on the handle 20 so that they can be operated with the user's fingertip while the user grips the handle 20. In other embodiments, the trigger 22, the rotary dial 24, or the lock button 26 may be removed from the handle 20.

The trigger 22 is pulled by the user to adjust the flow rate of the airflow discharged from the discharge port 9. The rotary dial 24 is rotated by the user to set the maximum flow rate of the airflow. The lock button 26 is moved to a locked position or to an unlocked position by the user to hold the trigger 22 in the maximum pulled position or release the trigger 22 from the maximum pulled position. With the trigger 22 pulled to the maximum pulled position and the lock button 26 moved to the locked position, the lock button 26 is engaged with the trigger 22 and holds the trigger 22 in the maximum pulled position. With the lock button 26 moved to the unlocked position, the lock button 26 is disengaged from the trigger 22. When the lock button 26 is disengaged from the trigger 22, the user can move the trigger 22 between the unpulled position (or the initial position) and the maximum pulled position.

2-1-2. Electrical Configuration

Figure 2:
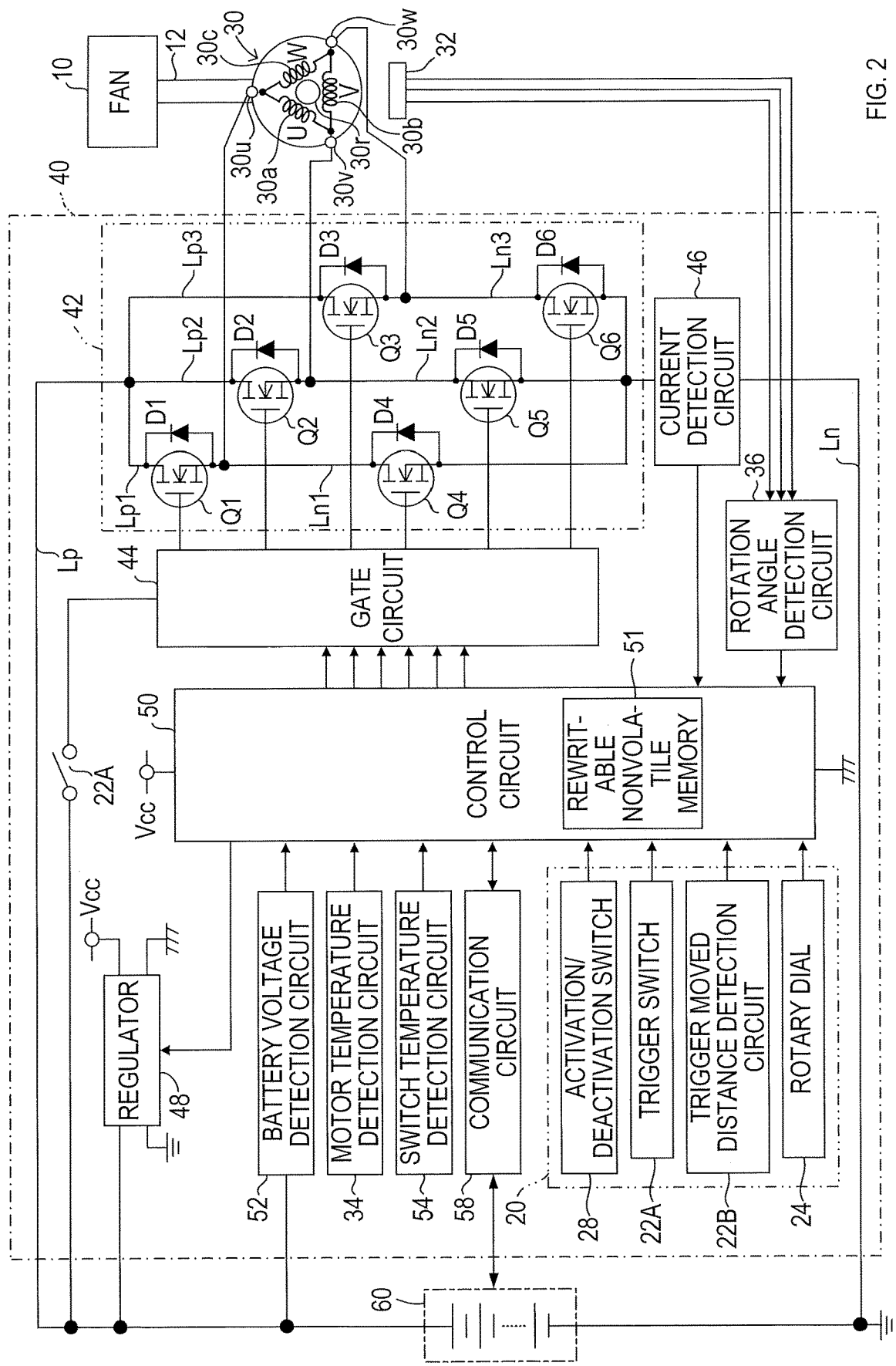
FIG. 2 is a block diagram showing an electrical configuration of the backpack-type blower.

As shown in FIG. 2, the blower 2 includes a fan 10 configured to rotate to generate the airflow. The fan 10 is housed in the blower main body 6. The fan 10 is attached to an output shaft 12.

The blower 2 includes a motor 30. The motor 30 is housed in the blower main body 6. The motor 30 rotationally drives the output shaft 12 directly or indirectly through a gear mechanism to rotate the fan 10.

In this first embodiment, the motor 30 is in the form of a three-phase brushless DC motor. The motor 30 includes first through third windings 30a through 30c, a rotor 30r, and first through third terminals 30u through 30w. The first through third windings 30a through 30c are connected to each other in a delta configuration. The first through third windings 30a through 30c respectively correspond to the U-phase, the V-phase, and the W-phase of the motor 30. The rotor 30r includes a not-shown permanent magnet. The first terminal 30u is connected to a first end of the first winding 30a and also to a first end of the third winding 30c. The second terminal 30v is connected to a second end of the first winding 30a and also to a first end of the second winding 30b. The third terminal 30w is connected to a second end of the second winding 30b and also to a second end of the third winding 30c. In other embodiments, the motor 30 may be a brushless motor in any other form, such as a single-phase brushless DC motor, a two-phase brushless DC motor, and a brushless DC motor with four or more phases. In other embodiments, the first through third windings 30a through 30c may be connected to each other in a star configuration (or Y-configuration).

In this first embodiment, the motor 30 further includes a rotation sensor 32. The rotation sensor 32 includes not-shown three Hall sensors arranged around the rotor 30r. These Hall sensors output first through third Hall signals. The first, second, and third Hall signals respectively correspond to the U-phase, V-phase, and W-phase of the motor 30. Each of the first through third Hall signals is an analog signal, and each time the motor 30r rotates by 180 electrical degrees, the logical value of each of the first through third Hall signals is inverted.

The blower 2 includes a controller 40. In this first embodiment, the controller 40 is fixed on the back carrier 4 together with the blower main body 6. In other embodiments, the controller 40 may be arranged in other area in the blower 2, such as the inside of the blower main body 6.

The controller 40 is configured to receive a DC voltage (hereinafter, referred to as "battery voltage") from the battery pack 60 and also configured to drive and control the motor 30.

More specifically, the controller 40 includes a regulator 48. The regulator 48 receives the battery voltage and generates an operating voltage Vcc. The operating voltage Vcc is a fixed DC voltage. Each part of the controller 40 operates with this operating voltage Vcc.

The controller 40 includes a positive-side current path Lp. The positive-side current path Lp is connected to a positive electrode of the battery pack 60. The controller 40 includes a negative-side current path Ln. The negative-side current path Ln is connected to a negative electrode of the battery pack 60.

The controller 40 includes a bridge circuit 42. The bridge circuit 42 delivers a drive current from the battery pack 60 (more specifically, from a battery or batteries in the battery pack 60) to the first through third windings 30a through 30c to rotate the rotor 30r. In this first embodiment, the bridge circuit 42 is in the form of a three-phase full-bridge circuit. In other embodiments, the bridge circuit 42 may be any bridge circuit other than the three-phase full-bridge circuit. In other embodiments, the bridge circuit 42 may be arranged in the blower 2 apart from the controller 40.

The bridge circuit 42 includes, as so-called upper arms, first through third positive-side conduction paths Lp1 through Lp3. The first through third positive-side conduction paths Lp1 through Lp3 are configured to electrically connect the positive-side current path Lp to the first through third terminals 30u through 30w respectively and deliver the drive current from the positive-side current path Lp to the first through third terminals 30u through 30w respectively. The first through third positive-side conduction paths Lp1 through Lp3 respectively include first through third switch devices Q1 through Q3 thereon, as so-called high-side switches. The first through third positive-side conduction paths Lp1 through Lp3 are completed or interrupted by the first through third switch devices Q1 through Q3.

The bridge circuit 42 includes, as so-called lower arms, first through third negative-side conduction paths Ln1 through Ln3. The first through third negative-side conduction paths Ln1 through Ln3 are configured to electrically connect the negative-side current path Ln to the first through third terminals 30u through 30w respectively and deliver the drive current to the negative-side current path Ln from the first through third terminals 30u through 30w respectively. The first through third negative-side conduction paths Ln1 through Ln3 respectively include fourth through sixth switch devices Q4 through Q6 thereon, as so-called low-side switches. The first through third negative-side conduction paths Ln1 through Ln3 are completed or interrupted by the fourth through sixth switch devices Q4 through Q6.

The first through sixth switch devices Q1 through Q6 are semiconductor switches. In this first embodiment, the first through sixth switch devices Q1 through Q6 are in the form of N-Channel-type Metal Oxide Semiconductor Field Effect Transistors (MOSFETs). Thus, the first through sixth switch devices Q1 through Q6 incorporate first through sixth diodes D1 through D6 (so-called parasitic diodes or body diodes). More specifically, the first through sixth diodes D1 through D6 include cathodes connected to respective drains of the first through sixth switch devices Q1 through Q6. The first through sixth diodes D1 through D6 include anodes connected to respective sources of the first through sixth switch devices Q1 through Q6. In other embodiments, the first through sixth diodes D1 through D6 may be added to the first through sixth switch devices Q1 through Q6 in addition to the parasitic diodes or the body diodes thereof.

When any of the first through sixth switch devices Q1 through Q6 is in an OFF-state, the first through sixth diodes D1 through D6 can bypass the drive current in a direction from the negative-side current path Ln to the positive-side current path Lp. In other embodiments, the first through sixth switch devices Q1 through Q6 may be semiconductor devices in any other form, such as bipolar transistors and Insulated Gate Bipolar Transistors (IGBTs).

The controller 40 includes a gate circuit 44. The gate circuit 44 is electrically connected to the positive electrode of the battery pack 60 through a trigger switch 22A. The gate circuit 44 receives the battery voltage from the battery pack 60 and drives the first through sixth switch devices Q1 through Q6. The trigger switch 22A is provided to the handle 20 and is electrically connected to the gate circuit 44 through the above-described electric cable 29. The trigger switch 22A in this first embodiment is configured to turn on in response to the trigger 22 being pulled.

The controller 40 includes a control circuit 50. The control circuit 50 outputs first through sixth control signals to the gate circuit 44 and drives and controls the motor 30 through the gate circuit 44 and the bridge circuit 42, The first through sixth control signals respectively correspond to the first through sixth switch devices Q1 through Q6. The gate circuit 44 turns on and off the first through sixth switch devices Q1 through Q6 according to the first through sixth control signals. The first through third control signals may be pulse-width modulated (PWM) signals, and the fourth through sixth control signals may be non-PWM signals, or may be vice-versa. Alternatively, all of the first through sixth control signals may be the PWM signals.

The control circuit 50 in this first embodiment is in the form of a microcontroller unit (MCU) (or a microcomputer) including a CPU, ROM, and RAM, which are not shown. In this first embodiment, the control circuit 50 includes a rewritable nonvolatile memory 51 for storing a state (abnormal state or the like) of the motor 30 and the controller 40. In other embodiments, instead of or in addition to the MCU, the control circuit 50 may include a discrete electronic component, a wired logic, an Application Specific Integrated Circuit (ASIC), an Application Specific Standard Product (ASSP), a programmable logic device (e.g. a Field Programmable Gate Array (FPGA)), and/or a combination thereof.

The control circuit 50 is electrically connected to the above-described trigger switch 22A through the above-described electric cable 29.

The control circuit 50 is electrically connected, through the electric cable 29, to a trigger moved distance detection circuit 22B provided to the handle 20. The control circuit 50 receives a trigger moved distance signal from the trigger moved distance detection circuit 22B. The trigger moved distance signal indicates a pulled distance of the trigger 22 (hereinafter, also referred to as "trigger moved distance Ptgr"). The trigger moved distance Ptgr is a first input variable supplied to the control circuit 50 through the trigger 22. The trigger moved distance detection circuit 22B in this first embodiment includes a not-shown variable resistor. The resistance value of this variable resistor varies according to the trigger moved distance Ptgr. With this variable resistor, the trigger moved distance signal in this first embodiment has a variable voltage corresponding to the trigger moved distance Ptgr.

The control circuit 50 is electrically connected, through the electric cable 29, to the above-described rotary dial 24 provided to the handle 20. The control circuit 50 receives a dial angle signal from the rotary dial 24. The dial angle signal indicates a rotation angle of the rotary dial 24 (hereinafter, also referred to as "dial angle Pdial"). The dial angle Pdial is a second input variable supplied to the control circuit 50 through the rotary dial 24. The rotary dial 24 in this first embodiment includes a not-shown variable resistor. The resistance value of this variable resistor varies according to the dial angle Pdial. With this variable resistor, the dial angle signal in this first embodiment has a variable voltage corresponding to the dial angle Pdial.

The control circuit 50 is electrically connected, through the electric cable 29, to an activation/deactivation switch 28 provided to the handle 20. The control circuit 50 receives an activation/deactivation signal from the activation/deactivation switch 28. The activation/deactivation switch 28 in this first embodiment is a momentary switch and is normally opened. Every time the activation/deactivation switch 28 is manually operated (e.g., pressed) by the user (that is, every time the control circuit 50 receives the activation/deactivation signal), the control circuit 50 switches the controller 40 between an ON-state (or an activated state) and an OFF-state (or a deactivated state).

The controller 40 includes a battery voltage detection circuit 52. The battery voltage detection circuit 52 detects a magnitude of the battery voltage. The battery voltage detection circuit 52 outputs a battery voltage detection signal to the control circuit 50. The battery voltage detection signal has a variable voltage corresponding to the magnitude of the battery voltage.

The controller 40 includes a current detection circuit 46 on the negative-side current path Ln. The current detection circuit 46 detects a magnitude of the drive current flowing through the motor 30. The current detection circuit 46 outputs a drive current detection signal to the control circuit 50. The drive current detection signal has a variable voltage corresponding to the magnitude of the drive current.

The controller 40 includes a motor temperature detection circuit 34. The motor temperature detection circuit 34 outputs a motor temperature detection signal to the control circuit 50. The motor temperature detection circuit 34 includes a not-shown temperature sensor (e.g. a thermistor) provided to the motor 30. The motor temperature detection signal has a variable voltage corresponding to the temperature of the motor 30.

The controller 40 includes a rotation angle detection circuit 36. The rotation angle detection circuit 36 receives the first through third Hall signals from the rotation sensor 32. The rotation angle detection circuit 36 detects a rotation angle (or a rotational position) of the rotor 30r (hereinafter, also referred to as "rotor angle") based on the first through third Hall signals.

The rotation angle detection circuit 36 includes a not-shown waveform shaping circuit. This waveform shaping circuit shapes the first through third Hall signals into pulse forms (see FIG. 4 and FIG. 5). The logical values of the pulsed first through third Hall signals are also inverted every time the rotor 30r rotates by 180 electrical degrees.

The rotation angle detection circuit 36 outputs a rotation angle detection signal to the control circuit 50 at 60-electrical-degree intervals based on each rising edge and/or falling edge of the pulsed first through third Hall signals. The rotation angle detection signal indicates that the rotor 30r has rotated by 60 electrical degrees.

The control circuit 50 detects the rotor angle based on the rotation angle detection signal. The control circuit 50 also detects, based on the rotation angle detection signal, an actual number of rotations per unit time (i.e. an actual rotational frequency or an actual rotational speed) of the motor 30.

The controller 40 includes a switch temperature detection circuit 54. The switch temperature detection circuit 54 outputs a switch temperature detection signal to the control circuit 50. The switch temperature detection circuit 54 includes a not-shown temperature sensor (e.g. a thermistor) provided to the bridge circuit 42. The switch temperature detection signal indicates a temperature in the vicinity of the first through sixth switch devices Q1 through Q6 (i.e. a temperature of the bridge circuit 42). The switch temperature detection signal has a variable voltage corresponding to the temperature in the vicinity of the first through sixth switch devices Q1 through Q6.

The controller 40 includes a communication circuit 58. The communication circuit 58 communicates with a not-shown communication circuit provided to the battery pack 60. The control circuit 50 obtains information from the battery pack 60 through the communication circuit 58. This information indicates a remaining electric energy in the battery and/or a degradation of the battery. The control circuit 50 determines, based on the information obtained from the battery pack 60, whether the battery pack 60 has an electric energy equal to or more than a predetermined minimum electric energy. This minimum electric energy may be any amount, and may be a minimum amount required to start the motor 30, for example.

2-1-3. Details of Processes Executed by Control Circuit

A description will be made of a first control process executed by the control circuit 50 to control the motor 30. In this first embodiment, the control circuit 50 executes the following first control process as a main routine when the control circuit 50 determines that the battery pack 60 is non-faulty and has the electric energy equal to or more than the minimum electric energy.

Figure 3:
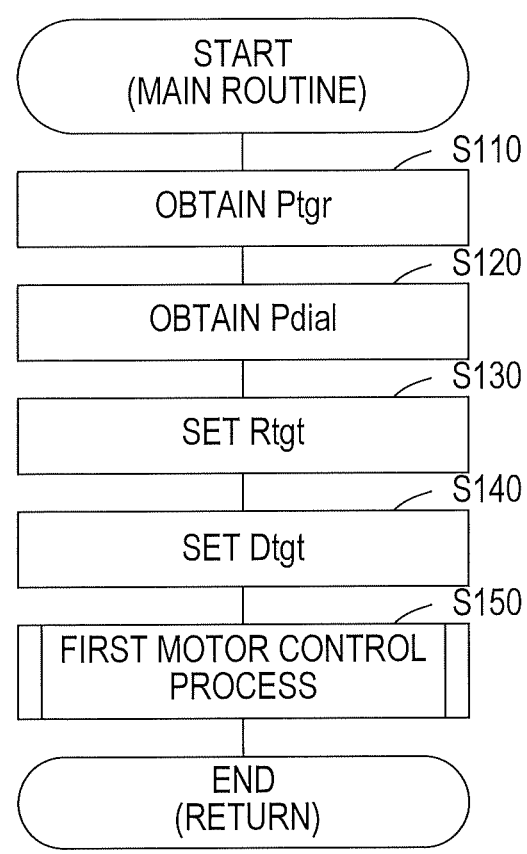
FIG. 3 is a flow chart of a first control process.

As shown in FIG. 3, in S110 ("S" means step), the control circuit 50 firstly obtains the trigger moved distance Ptgr from the trigger moved distance detection circuit 22B. In S120, the control circuit 50 obtains the dial angle Pdial from the rotary dial 24.

In S130, the control circuit 50 sets a target rotational frequency (or a desired rotational frequency) Rtgt of the motor 30 based on the obtained trigger moved distance Ptgr and the obtained dial angle Pdial.

In this first embodiment, the control circuit 50 calculates the target rotational frequency Rtgt based on the following formula (i).

$$Rtgt = R\,max \times Ptgr \times Pdial \qquad \text{Formula (i)}$$

In the formula (i), "Rmax" represents a permissible maximum rotational frequency of the motor 30. The trigger moved distance Ptgr may be expressed in a ratio relative to the maximum moved distance of the trigger 22. The dial angle Pdial may be expressed in a ratio relative to the maximum rotation angle of the rotary dial 24.

In accordance with the formula (i), the control circuit 50 sets the target rotational frequency Rtgt so that the larger the trigger moved distance Ptgr is and the larger the dial angle Pdial is, the closer the target rotational frequency Rtgt is to the permissible maximum rotational frequency Rmax.

In subsequent S140, the control circuit 50 sets a target duty ratio (or a desired duty ratio or a required duty ratio) Dtgt based on the trigger moved distance Ptgr and the dial angle Pdial respectively obtained in S110 and S120.

In this first embodiment, the control circuit 50 calculates the target duty ratio Dtgt based on the following formula (ii).

$$Dtgt = 100\% \times Ptgr \times Pdial \times K \qquad \text{Formula (ii)}$$

In the formula (ii), "K" is a correction factor. The correction factor K in this first embodiment is set to correct the target duty ratio Dtgt to 100% when "Ptgr×Pdial" is equal to or more than a preset threshold. "Ptgr×Pdial" is a manually operated parameter that varies according to the trigger moved distance Ptgr and the dial angle Pdial.

In accordance with the formula (ii), the control circuit 50 sets the target duty ratio Dtgt so that the larger the trigger moved distance Ptgr is and the larger the dial angle Pdial is, the closer the target duty ratio Dtgt is to 100% when the manually operated parameter "Ptgr×Pdial" is less than the threshold. In a case where the manually operated parameter "Ptgr×Pdial" is equal to or more than the threshold, the control circuit 50 sets the target duty ratio Dtgt to 100%.

After the target rotational frequency Rtgt and the target duty ratio Dtgt are set, the control circuit 50 proceeds to S150 and executes a first motor control process. In the first motor control process, the control circuit 50 controls the motor 30 based on the target rotational frequency Rtgt and the target duty ratio Dtgt.

Figure 4:
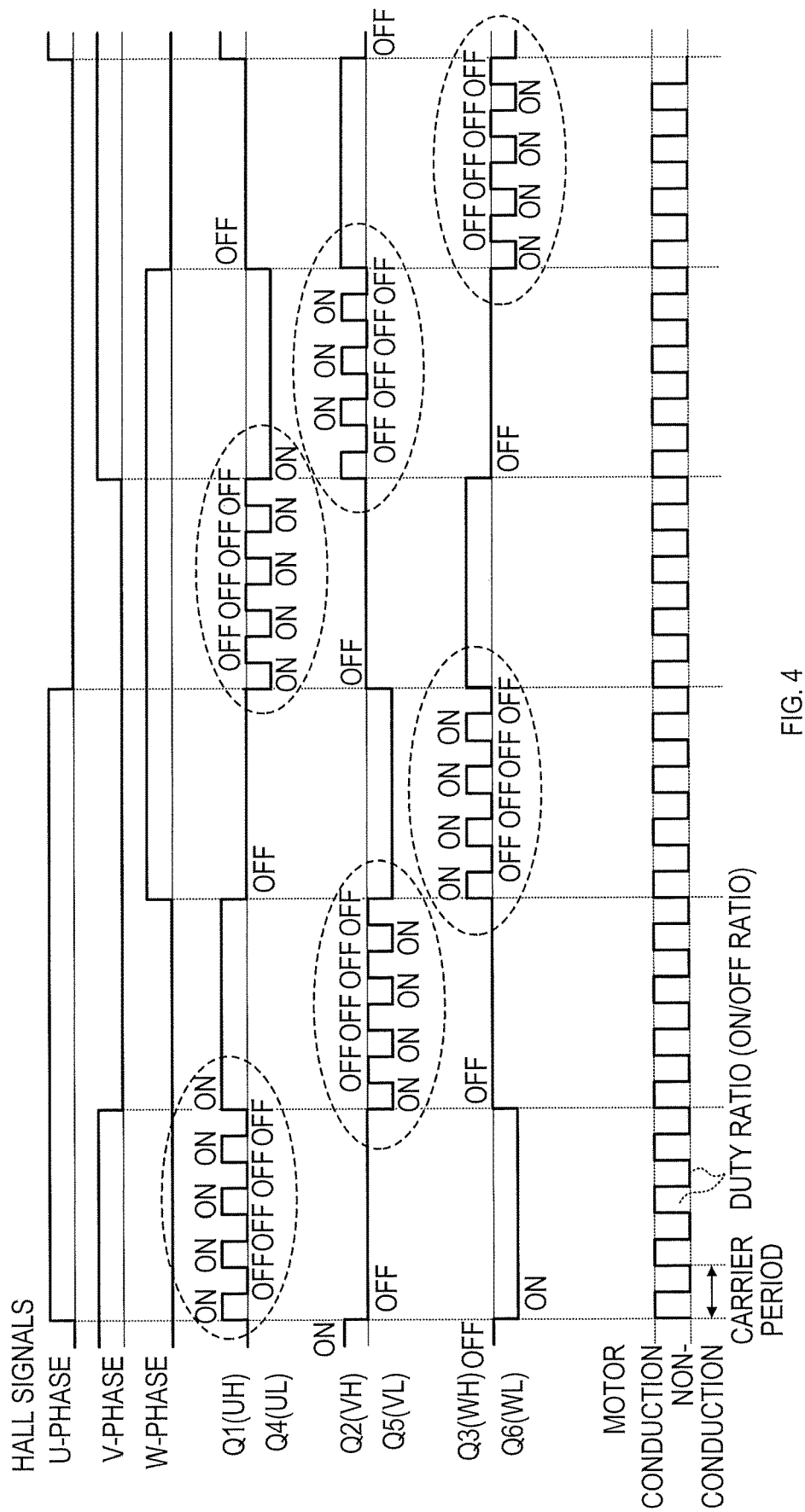
FIG. 4 is a timing chart of a pulse width modulation control.
Figure 5:
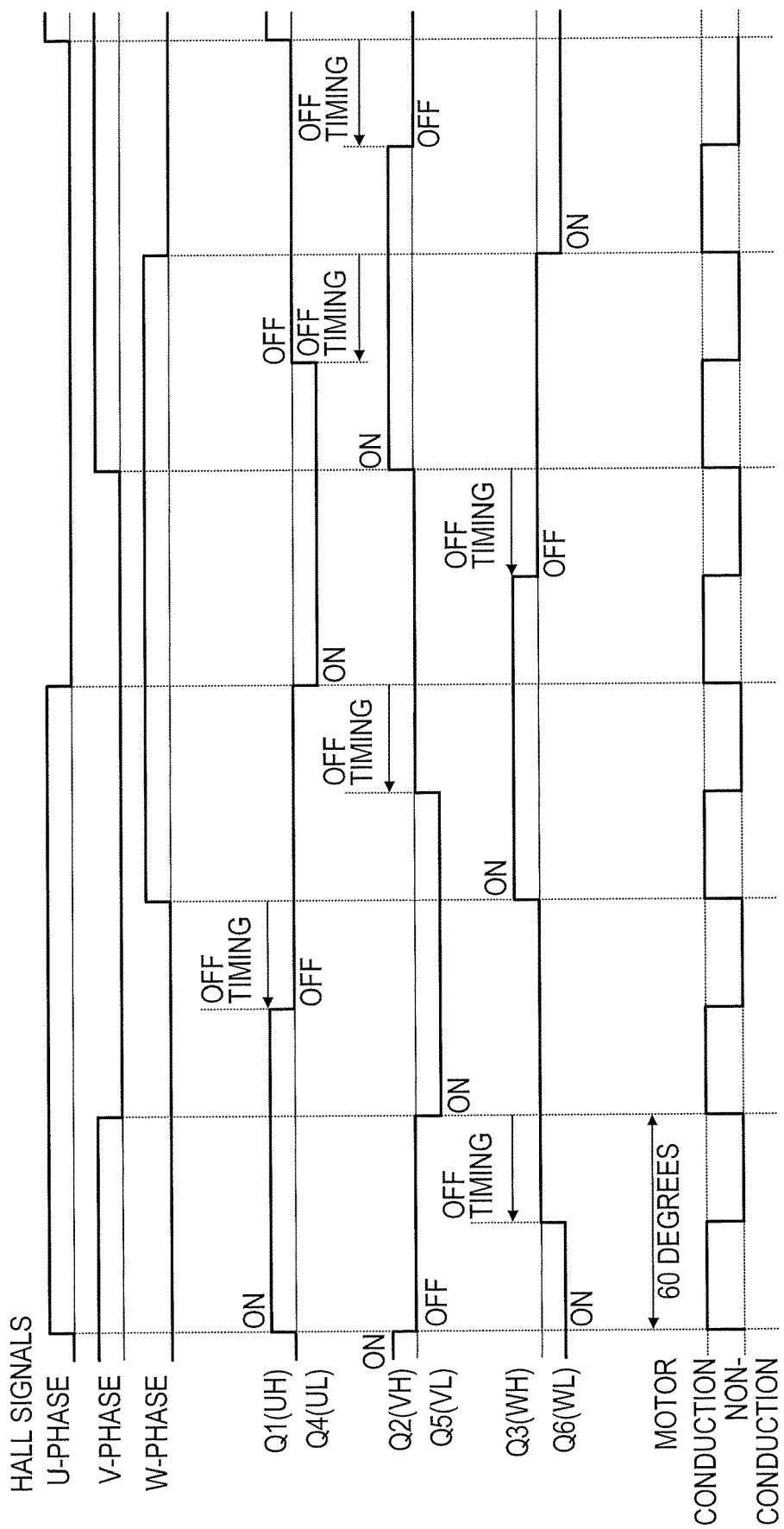
FIG. 5 is a timing chart of a conduction angle control.

More specifically, in S150, the control circuit 50 executes a PWM control shown in FIG. 4 in combination with a conduction angle control shown in FIG. 5.

As shown in FIG. 4, in the PWM control, every time the rotor 30r rotates by 60 electrical degrees, the control circuit 50 drives the first through sixth switch devices Q1 through Q6 in pairs. In this first embodiment, every time the rotor 30r rotates by 60 electrical degrees, the control circuit 50 sequentially drives the following first through sixth pairs through the gate circuit 44.

The first pair: the first switch device Q1 and the sixth switch device Q6

The second pair: the first switch device Q1 and the fifth switch device Q5

The third pair: the third switch device Q3 and the fifth switch device Q5

The fourth pair: the third switch device Q3 and the fourth switch device Q4

The fifth pair: the second switch device Q2 and the fourth switch device Q4

The sixth pair: the second switch device Q2 and the sixth switch device Q6

In this first embodiment, in each of the first through sixth pairs, the control circuit 50 drives one switch device (hereinafter, also referred to as "PWM-driven switch") with the PWM signal and drives the other switch device (hereinafter, also referred to as "non-PWM-driven switch") with the non-PWM signal. The control circuit 50 controls the magnitude of the drive current by (i) repeatedly turning on and off the PWM-driven switch with the PWM signal at regular intervals and by (ii) setting and maintaining the non-PWM-driven switch in the ON-state with the non-PWM signal. In other embodiments, both switch devices of each pair may be the PWM-driven switches. Alternatively, the control circuit 50 may interchange the PWM-driven switches between the high-side switches and the low-side switches at any timing.

The target duty ratio Dtgt set in S140 is used to produce the PWM signal.

Through such PWM control, the actual rotational frequency Rnow of the motor 30 is controlled to be consistent with the target rotational frequency Rtgt. Each of respective periods during which the first through sixth switch devices Q1 through Q6 are driven is, so-called, the conduction angle.

In a case where the magnitude of the conduction angle is fixed to 120 electrical degrees, the first through sixth switch devices Q1 through Q6 are sequentially turned on and off while the motor 30 rotates by 360 electrical degrees. As a result, the first through sixth switch devices Q1 through Q6 can generate a large amount of power loss, and a high heat can be generated in the bridge circuit 42.

In this first embodiment, the conduction angle control exemplified in FIG. 5 is executed in addition to the PWM control. As a result, every time the motor 30 rotates by 60 electrical degrees (i.e. before the rotor angle reaches the next conduction angle), each duration when the PWM control is executed, i.e. each duration when each of the first through sixth switch devices Q1 through Q6 is driven is adjusted (or shortened), whereby the heat generated in the bridge circuit 42 can be inhibited.

In the conduction angle control, the magnitude of the conduction angle is set to be smaller than 120 electrical degrees that is the maximum magnitude of the conduction angle. After the conduction angle is elapsed, the first through sixth switch devices Q1 through Q6 are forced to be turned off.

In this first embodiment, the conduction angle control is executed in combination with the PWM control, and thus, while the heat generated in the first through sixth switch devices Q1 through Q6 is inhibited, the actual rotational frequency Rnow is controlled (or adjusted) to be the target rotational frequency Rtgt.

In the PWM control, after the motor 30 is started to be driven, an actual duty ratio (or an output duty ratio or a drive duty ratio) Dnow of the PWM signal is gradually increased to the target duty ratio Dtgt. As a result, the motor 30 is soft-started, thereby inhibiting a rush current from flowing into the motor 30.

Figure 6:
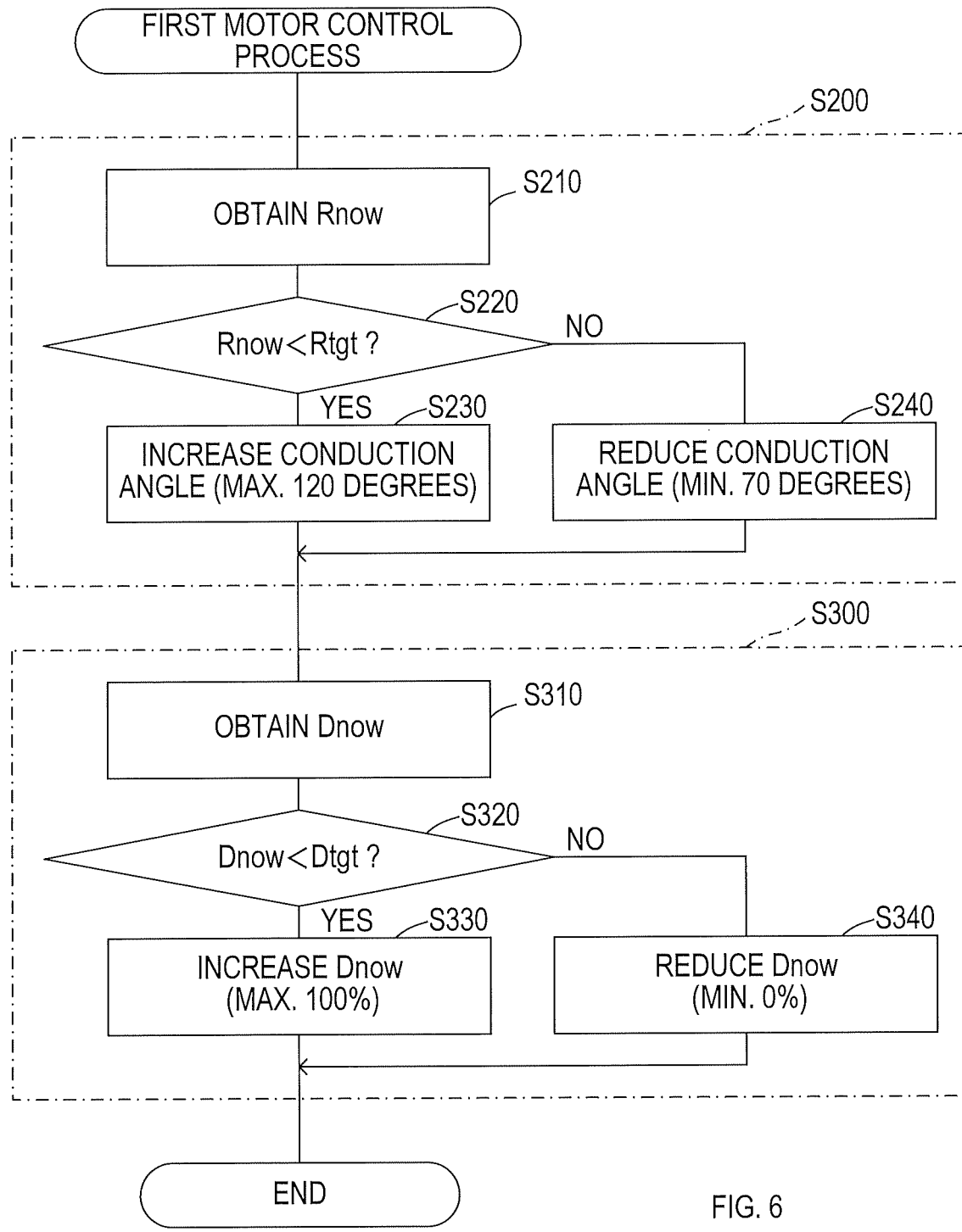
FIG. 6 is a flow chart of a first motor control process.

In the first motor control process in S150, as shown in FIG. 6, the control circuit 50 executes a conduction angle setting process in S200. In the conduction angle setting process, the control circuit 50 controls (or adjusts, or changes, or varies, or updates) the magnitude of the conduction angle for the conduction angle control so that the actual rotational frequency Rnow is consistent with the target rotational frequency Rtgt.

In subsequent S300, the control circuit 50 executes a first duty ratio setting process. In the first duty ratio setting process, the control circuit 50 controls (or adjusts, or changes, or varies, or updates) the actual duty ratio Dnow so that the actual duty ratio Dnow is consistent with the target duty ratio Dtgt.

The sequence of the executions of the conduction angle setting process of S200 and the first duty ratio setting process of S300 may be changed as long as these processes can be executed almost simultaneously. That is, the first duty ratio setting process of S300 may be executed after the conduction angle setting process of S200 as shown in FIG. 6 or may be executed before the conduction angle setting process of S200.

As shown in FIG. 6, in the conduction angle setting process, the control circuit 50 obtains, in S210, a current (or present) actual rotational frequency Rnow based on the rotation angle detection signal input by the rotation angle detection circuit 36.

In subsequent S220, the control circuit 50 compares the obtained current actual rotational frequency Rnow with the target rotational frequency Rtgt set in S130. If the actual rotational frequency Rnow is lower than the target rotational frequency Rtgt (S220: YES), the control circuit 50 proceeds to S230. In S230, the control circuit 50 adds a preset fixed value to the conduction angle currently set to increase the conduction angle and proceeds to S300.

Figure 7:
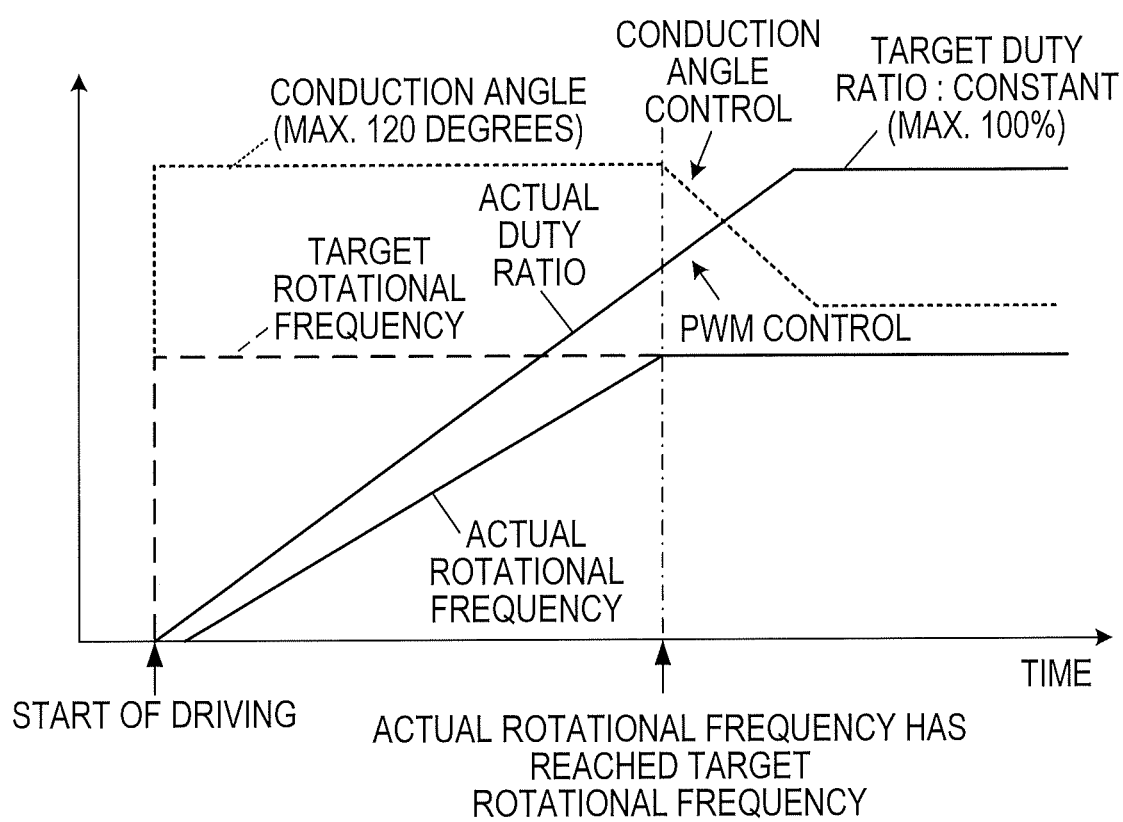
FIG. 7 shows respective profiles of an actual duty ratio, a conduction angle, and an actual rotational frequency in the first motor control process.

The maximum magnitude of the conduction angle is 120 electrical degrees as described above. Therefore, in S230, The electrical angle of 120 degrees is the upper limit of the magnitude of the conduction angle. The initial magnitude of the conduction angle at the time of starting to drive the motor 30 is set to the upper limit. As shown in FIG. 7, after the start of driving the motor 30, the magnitude of the conduction angle is maintained to 120 electrical degrees until the actual rotational frequency Rnow reaches the target rotational frequency Rtgt.

In S220, if the actual rotational frequency Rnow is equal to or more than the target rotational frequency Rtgt (S220: NO), the control circuit 50 proceeds to S240. In S240, the control circuit 50 subtracts the preset fixed value from the conduction angle currently set to reduce the conduction angle, and proceeds to S300. In this first embodiment, the minimum magnitude of the conduction angle is set to 70 electrical degrees. Therefore, in S240, the electrical angle of 70 degrees is the lower limit of the magnitude of the conduction angle. In other embodiments, the minimum magnitude of the conduction angle may be larger or smaller than 70 electrical degrees.

In the first duty ratio setting process in S300, the control circuit 50 obtains, in S310, a current (or present) actual duty ratio Dnow. In subsequent S320, the control circuit 50 compares the obtained current actual duty ratio Dnow with the target duty ratio Dtgt set in S140.

If the current actual duty ratio Dnow is lower than the target duty ratio Dtgt (S320: NO), the control circuit 50 proceeds to S330. In S330, the control circuit 50 adds the preset fixed value to the current actual duty ratio Dnow to increase the actual duty ratio Dnow. Then, the control circuit 50 ends the first motor control process of S150.

In this first embodiment, the maximum value of the actual duty ratio Dnow is set to 100%. Therefore, in S330, the actual duty ratio Dnow can be increased up to 100%. The initial value of the actual duty ratio Dnow applied at the start of driving the motor 30 is set to 0% that is the minimum value of the actual duty ratio Dnow. In other embodiments, the maximum value of the actual duty ratio Dnow may be set to less than 100% and/or the minimum value of the actual duty ratio Dnow may be set to more than 0%.

After the completion of the first motor control process of S150, the control circuit 50 proceeds to S110 and executes again the processes in and after S110.

2-1-4. Summary of Operation

As described above, in the blower 2 of this first embodiment, the target rotational frequency Rtgt and the target duty ratio Dtgt are set according to the trigger moved distance Ptgr and the dial angle Pdial.

After the start of driving the motor 30, the actual duty ratio Dnow is gradually increased from 0% to the target duty ratio Dtgt. The magnitude of the conduction angle is set to 120 electrical degrees until the actual rotational frequency Rnow reaches the target rotational frequency Rtgt.

As shown in FIG. 7, after the start of driving the motor 30, the actual rotational frequency Rnow increases with a substantially constant slope or gradient (i.e. rate of increase) in accordance with an increase in the actual duty ratio Dnow. After the actual rotational frequency Rnow reaches the target rotational frequency Rtgt, the magnitude of the conduction angle is controlled by the conduction angle control to maintain the actual rotational frequency Rnow at the target rotational frequency Rtgt.

In a case where the actual duty ratio Dnow does not reach the target duty ratio Dtgt in a state that (i) the target duty ratio Dtgt is set to 100% and (ii) the actual rotational frequency Rnow reaches the target rotational frequency Rtgt, the actual duty ratio Dnow continuously increases, and the electric power delivered to the motor 30 is increased by the PWM control. However, the magnitude of the conduction angle is reduced by the conduction angle control, whereby the electric power delivered to the motor 30 is inhibited from increasing.

After the actual rotational frequency Rnow reaches the target rotational frequency Rtgt, the actual rotational frequency Rnow is controlled at the target rotational frequency Rtgt by the conduction angle control. As a result, the magnitude of the conduction angle applied to each of the first through sixth switch devices Q1 through Q6 becomes smaller than 60 electrical degrees.

In a case where the motor 30 is driven with (i) the manually operated parameter, which is determined by the trigger moved distance Ptgr and the dial angle Pdial, being equal to or more than the threshold and (ii) a large load being applied to the motor 30, the target duty ratio Dtgt is set to 100%. As a result, it is possible to inhibit each of the PWM-driven switches from repeatedly turning on and off in the corresponding conduction angle.

As described above, in the blower 2 of this first embodiment, it is possible to reduce the power loss generated in the first through sixth switch devices Q1 through Q6 and reduce the heat generated in the bridge circuit 42 due to the power loss.

Figure 8:
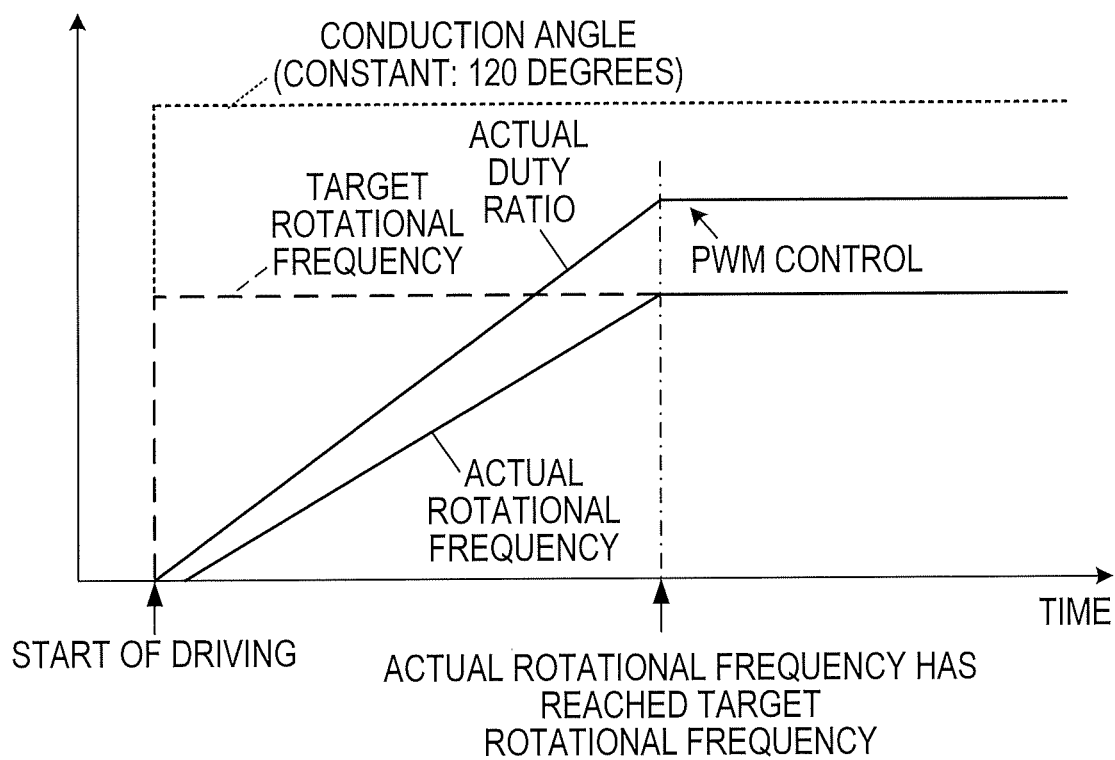
FIG. 8 shows respective profiles of an actual duty ratio and an actual rotational frequency in a pulse width modulation control with a conduction angle having a fixed magnitude of 120 degrees.

As shown in FIG. 8, in a case where the actual rotational frequency Rnow is controlled at the target rotational frequency Rtgt by the PWM control and the magnitude of the conduction angle is fixed to 120 electrical degrees, the first through sixth switch devices Q1 through Q6 sequentially and continuously turn on and off. In this case, the first through sixth switch devices Q1 through Q6 may generate a large amount of power loss, and a high heat may be generated in the bridge circuit 42. This first embodiment can reduce such problems.

2-1-5. Correspondence Between Terms

In this first embodiment, the fan 10 corresponds to one example of the driven equipment in the overview of the embodiments. Any one of the first through third terminals 30u through 30w corresponds to one example of the first terminal in the overview of the embodiments, and another of the first through third terminals 30u through 30w corresponds to one example of the second terminal in the overview of the embodiments. The battery pack 60 corresponds to one example of the DC power source in the overview of the embodiments. The combination of the positive-side current path Lp with any one of the first through third positive-side conduction paths Lp1 through Lp3 corresponds to one example of the first positive-side conduction path in the overview of the embodiments. The combination of the negative-side current path Ln with any one of the first through third negative-side conduction paths Ln1 through Ln3 corresponds to one example of the first negative-side conduction path in the overview of the embodiments. The PWM-driven switch in any one of the first through sixth pairs corresponds to one example of the first switch in the overview of the embodiments, and the non-PWM-driven switch in any one of the first through sixth pairs corresponds to one example of the second switch in the overview of the embodiments. The combination of the trigger 22 with the rotary dial 24 correspond to one example of the manual switch in the overview of the embodiments. Each of the trigger moved distance signal and the dial angle signal corresponds to one example of the input signal in the overview of the embodiments. Each of the trigger moved distance Ptrg and the dial angle Pdial corresponds to one example of the input variable in the overview of the embodiments.

2-2. Second Embodiment

As described above, in the first embodiment, in a case where the manually operated parameter, which is determined by the trigger moved distance Ptgr and the dial angle Pdial, are less than the threshold, a value corresponding to the manually operated parameter and less than 100% is set to the target duty ratio Dtgt.

In this second embodiment, the target duty ratio Dtgt is set to 100% independently from (or regardless of) the manually operated parameter.

Figure 9:
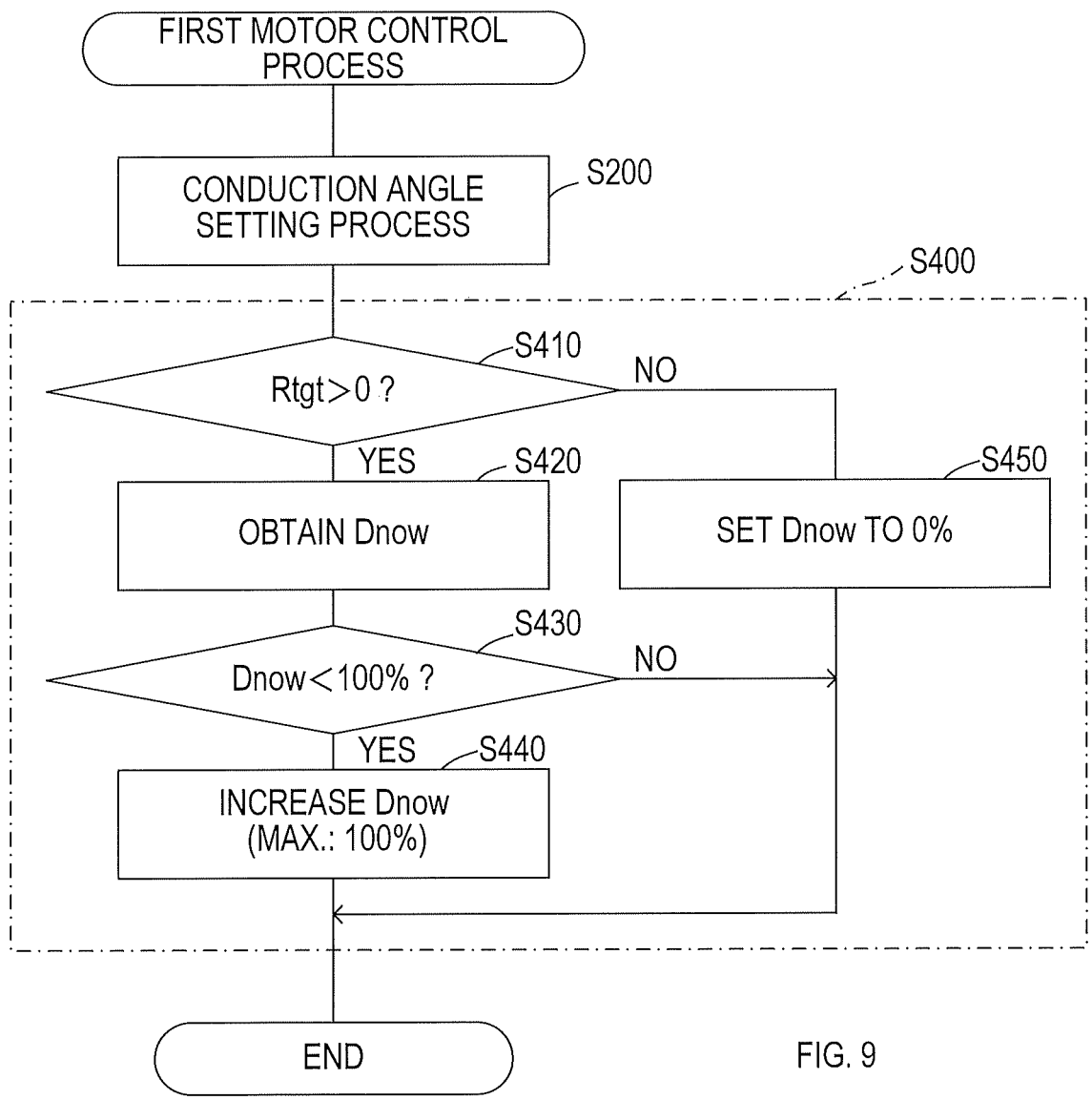
FIG. 9 is a flow chart of a first motor control process according to a second embodiment.

In the first motor control process of S150, in place of the first duty ratio setting process of S300 shown in FIG. 6, a second duty ratio setting process of S400 shown in FIG. 9 is executed.

As shown in FIG. 9, in the second duty ratio setting process of S400, the control circuit 50 determines, in S410, whether the target rotational frequency Rtgt is larger than zero, in other words, whether a driving requirement for the motor 30 is satisfied.

If the target rotational frequency Rtgt is larger than zero, that is, if the driving requirement is satisfied (S410: YES), the control circuit 50 proceeds to S420. If the driving requirement is not satisfied (S410: NO), the control circuit 50 proceeds to S450.

In S420, the control circuit 50 obtains the current actual duty ratio Dnow, and then determines in subsequent S430 whether the current actual duty ratio Dnow obtained is smaller than 100%.

If the current actual duty ratio Dnow is smaller than 100% (S430: YES), the control circuit 50 proceeds to S440. In S440, the control circuit 50 adds the preset fixed value to the current actual duty ratio Dnow and increases the actual duty ratio Dnow. After the completion of S440, the control circuit 50 ends the second duty ratio setting process.

In S430, if the current actual duty ratio Dnow reaches 100% (S430: NO), the control circuit 50 ends the second duty ratio setting process.

In S450, since the driving requirement for the motor 30 is not satisfied, the control circuit 50 sets the actual duty ratio Dnow to 0% and ends the second duty ratio setting process.

Figure 10:
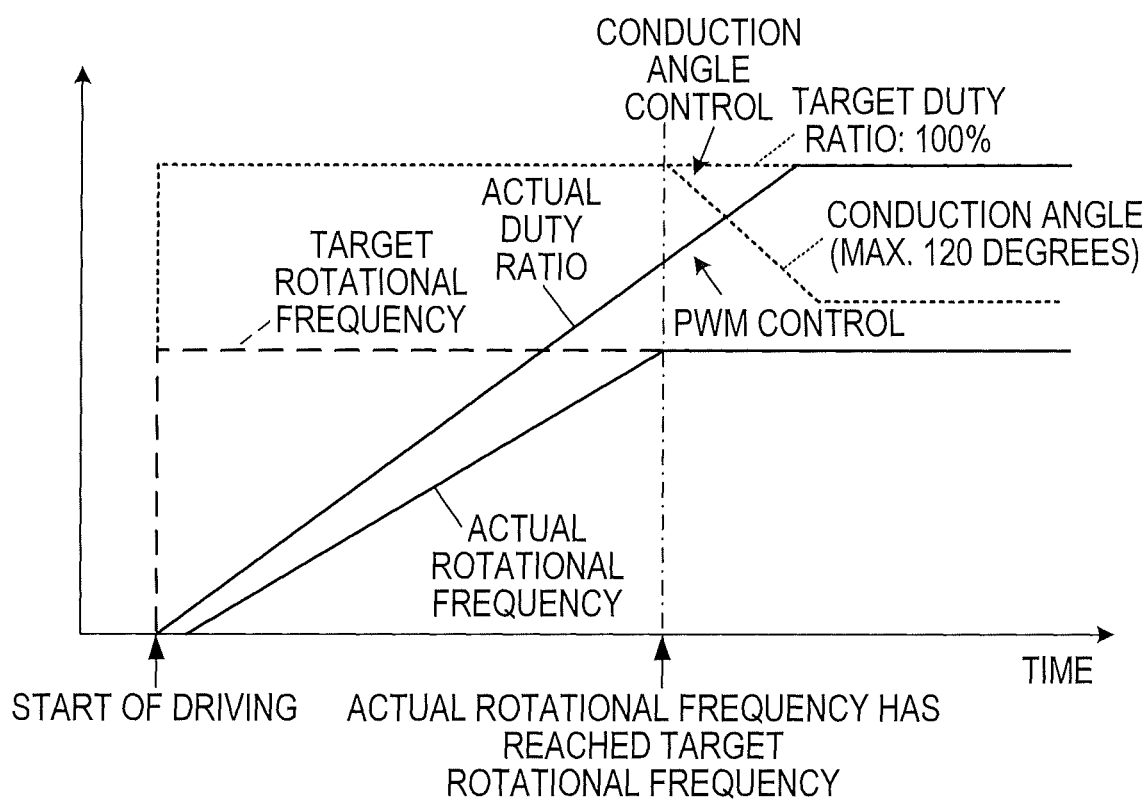
FIG. 10 shows respective profiles of an actual duty ratio, a conduction angle, and an actual rotational frequency in the first motor control process according to the second embodiment.

As shown in FIG. 10, in this second embodiment, the initial value of the target duty ratio Dtgt is set to 100% regardless of the manually operated parameter. On the other hand, the actual duty ratio Dnow is gradually increased by the preset fixed value from the start of driving the motor 30 until the actual duty ratio Dnow reaches 100%.

In this second embodiment, as in the same manner as the above-described first embodiment, after the start of driving the motor 30, the motor 30 is soft-started and an inrush current can be inhibited from flowing into the motor 30.

After the start of driving the motor 30, the PWM-driven switches are repeatedly turned on and off by the PWM control until the actual duty ratio Dnow reaches 100%. After the actual duty ratio Dnow reaches 100%, the PWM-driven switches are not repeatedly turned on and off by the PWM control.

In this second embodiment, it is possible to more effectively inhibit the power loss generated by the PWM-driven switches being turned on and off, thereby reducing the heat generated in the bridge circuit 42.

2-3. Third Embodiment

Figure 11:
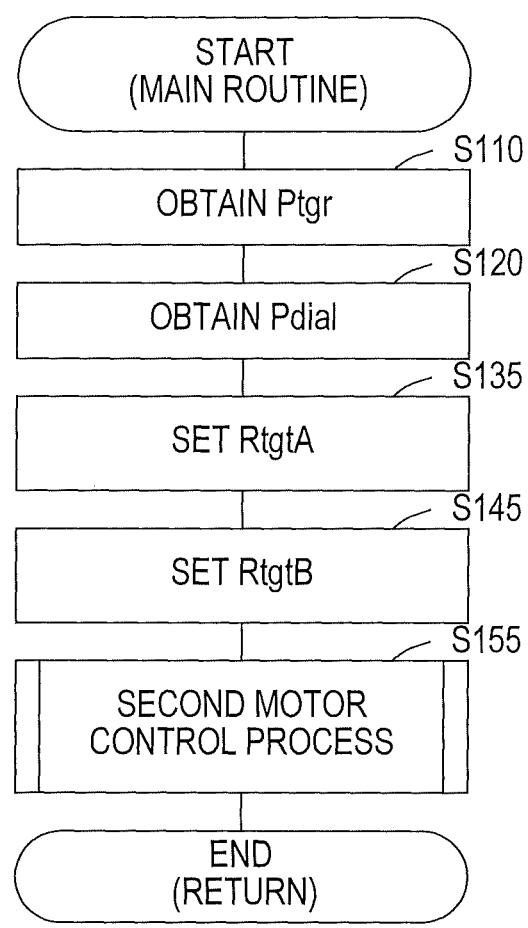
FIG. 11 is a flow chart of a second control process.

In this third embodiment, the control circuit 50 executes a second control process shown in FIG. 11 in place of the first control process shown in FIG. 3. In the second control process, the control circuit 50 executes processes S135 through S155 in place of the processes S130 through S150 shown in FIG. 3.

In S135, the control circuit 50 sets a first target rotational frequency RtgtA according to the manually operated parameter in the same manner as S130. The first target rotational frequency RtgtA is a target rotational frequency applied to the conduction angle control. In S145, the control circuit 50 adds a specified offset value (e.g. 500 rpm) to the first target rotational frequency RtgtA to set a second target rotational frequency RtgtB. The second target rotational frequency RtgtB is a target rotational frequency applied to the PWM control. In subsequent S155, the control circuit 50 executes a second motor control process by procedures shown in FIG. 12.

Figure 12:
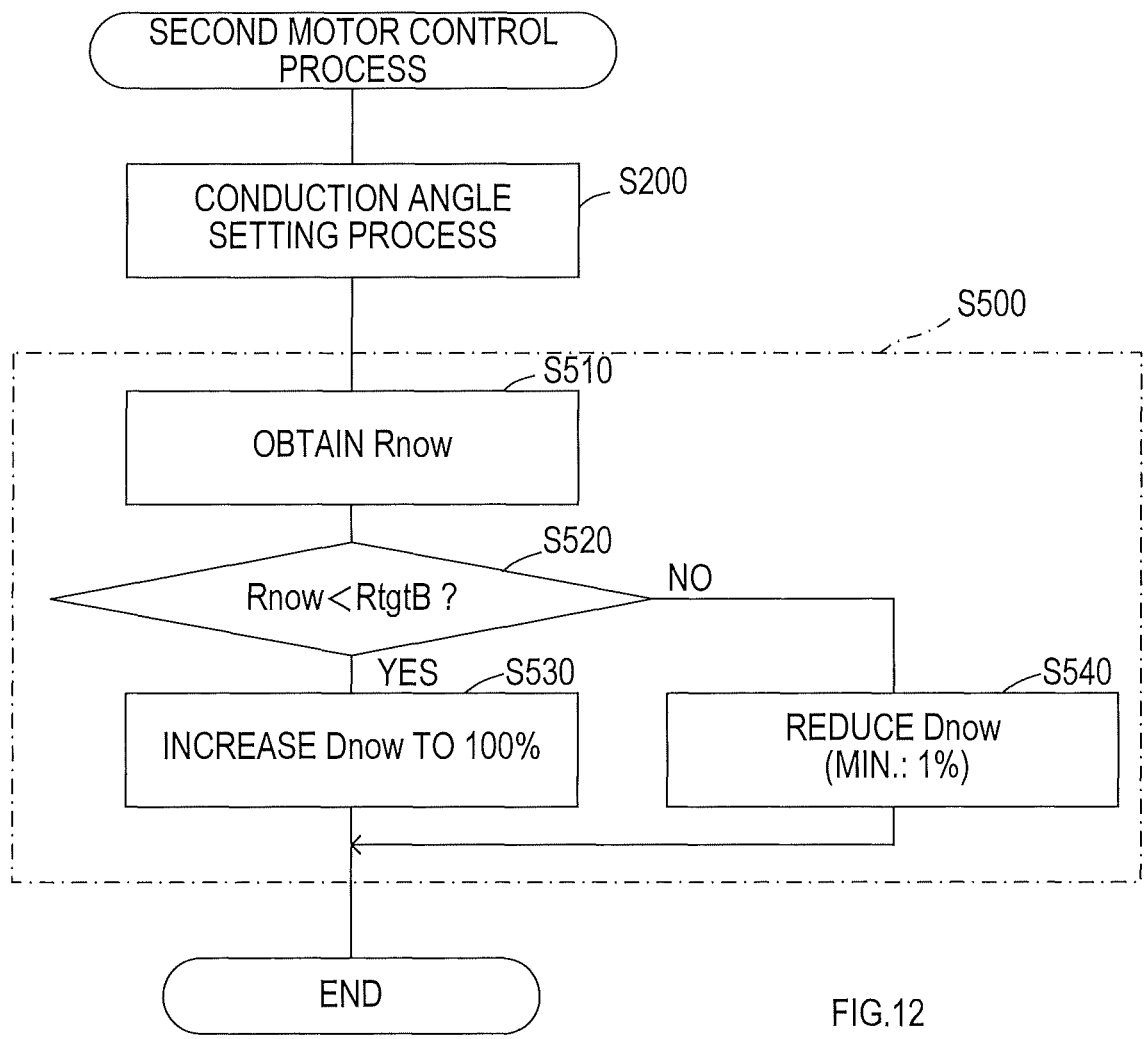
FIG. 12 is a flow chart of a second motor control process.

As shown in FIG. 12, in the second motor control process of S155, the control circuit 50 executes, in S200, the conduction angle setting process described in the first embodiment. In this third embodiment, the conduction angle setting process is executed in a manner similar to that of the first embodiment shown in FIG. 6. However, the control circuit 50 controls the magnitude of the conduction angle so that the actual rotational frequency Rnow of the motor 30 is consistent with the first target rotational frequency RtgtA.

In the second motor control process of S155, the control circuit 50 executes a third duty ratio setting process of S500 in place of the first duty ratio setting process of S300 in FIG. 6 or the second duty ratio setting process of S400 in FIG. 9.

In this third duty ratio setting process, the control circuit 50 obtains, in S510, the current actual rotational frequency Rnow based on the rotation angle detection signal input by the rotation angle detection circuit 36. In subsequent S520, the control circuit 50 compares the obtained current actual rotational frequency Rnow with the second target rotational frequency RtgtB set in S145.

If the actual rotational frequency Rnow is lower than the second target rotational frequency RtgtB (S520: YES), the control circuit 50 proceeds to S530. In S530, the control circuit 50 adds the preset fixed value to the current actual duty ratio Dnow to increase the actual duty ratio Dnow, and ends the third duty ratio setting process. In this third embodiment, the maximum value of the actual duty ratio Dnow is set to 100%. Therefore, in S530, the actual duty ratio Dnow can be increased up to 100%.

In S520, if the actual rotational frequency Rnow is equal to or more than the second target rotational frequency RtgtB (S520: NO), the control circuit 50 proceeds to S540. In S540, the control circuit 50 subtracts the preset fixed value from the current actual duty ratio Dnow to reduce the actual duty ratio Dnow, and ends the third duty ratio setting process. In this third embodiment, the minimum value of the actual duty ratio Dnow is set to 1%. Therefore, in S530, the actual duty ratio Dnow can be reduced down to 1%. In other embodiments, the minimum value of the actual duty ratio Dnow may be larger than 1%.

In this way, in this third embodiment, the first target rotational frequency RtgtA and the second target rotational frequency RtgtB are set. In the conduction angle control, the magnitude of the conduction angle is controlled so that the actual rotational frequency Rnow is consistent with the first target rotational frequency RtgtA. In the PWM control, the actual duty ratio Dnow is controlled so that the actual rotational frequency Rnow is consistent with the second target rotational frequency RtgtB.

Figure 13:
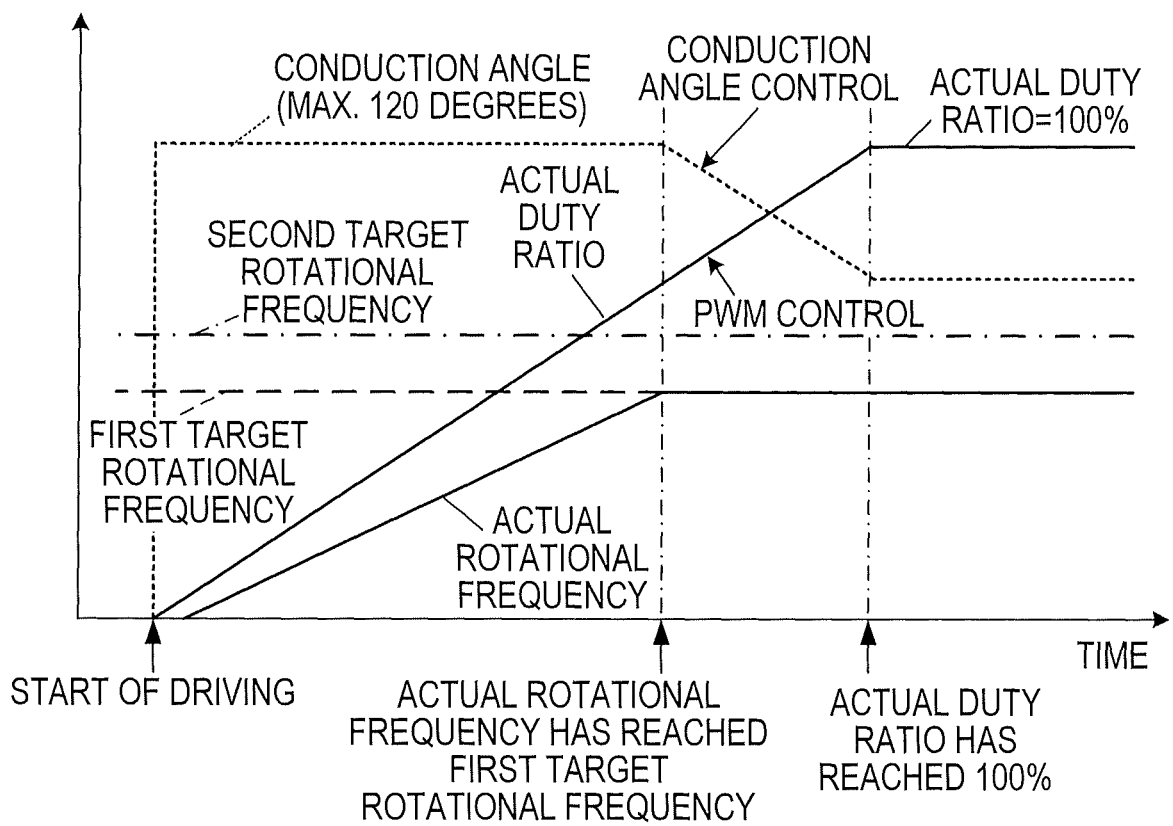
FIG. 13 shows respective profiles of an actual duty ratio, a conduction angle, and an actual rotational frequency in the second motor control process.

As shown in FIG. 13, the second target rotational frequency RtgtB is larger than the first target rotational frequency RtgtA by the offset value. Therefore, after the start of driving the motor 30, the actual rotational frequency Rnow reaches the first target rotational frequency RtgtA, and is maintained at the first target rotational frequency RtgtA by the conduction angle control.

Therefore, in the PWM control, even if the actual rotational frequency Rnow reaches the first target rotational frequency RtgtA, in order to further increase the actual rotational frequency Rnow, the actual duty ratio Dnow is gradually increased until the actual duty ratio Dnow reaches 100%.

Accordingly, in this third embodiment, the PWM control is executed similarly to the second embodiment, in which the target duty ratio Dtgt of the PWM control is set to 100%, and effects similar to those of the second embodiment can be exhibited, 2-4. Variation Although some example embodiments of the present disclosure have been described so far, the present disclosure is not limited to the above-described first through third embodiments, and can be carried out in variously modified ways.

In the above-described first through third embodiments, the combination of the trigger 22 and the rotary dial 24 is provided as the manual switch, and the target rotational frequency Rtgt and the target duty ratio Dtgt are set based on the manual operation performed on the trigger 22 and the rotary dial 24. However, the manual switch may be a manual switch in any form other than the trigger 22 and the rotary dial 24. Examples of the manual switch may include a keyboard, a touch panel and a Graphical User Interface (GUI).

In the above-described first through third embodiments, the target rotational frequency Rtgt and the target duty ratio Dtgt are set based on the trigger moved distance Ptrg and the dial angle Pdial. In other embodiments, the target rotational frequency Rtgt and/or the target duty ratio Dtgt may be set based on the numerical value input into the control circuit 50 through the manual switch.

In the same manner as the above-described first through third embodiments, the technique of the present disclosure can be applied to electric work machines in any form other than the blower, e.g., an electric work machine having a tool bit or other driven equipment (or a tool) different from the fan 10 attached to the output shaft thereof.

In the above-described first through third embodiments, the motor 30 includes the rotation sensor 32. However, the motor 30 does not necessarily include the rotation sensor 32. In this case, for example, as a so-called sensorless method, the rotation angle detection circuit 36 may detect the rotor angle based on induced voltages generated in the first through third windings 30a through 30c.

In the conduction angle control in the above-described first through third embodiments, as shown in FIG. 5, the magnitude of the conduction angle is made smaller than 120 electrical degrees by advancing the OFF timings to force the first through sixth switch devices Q1 through Q6 to turn off.

In other embodiments, the magnitude of the conduction angle may be controlled by delaying the ON timings of the first through sixth switch devices Q1 through Q6. Alternatively, the magnitude of the conduction angle may be controlled by adjusting both the ON timings and the OFF timings of the first through sixth switch devices Q1 through Q6. Alternatively, the magnitude of the conduction angle may be controlled by setting periods of turning off the first through sixth switch devices Q1 through Q6 during 120 electrical degrees.

Two or more functions of one element of the above-described first through third embodiments may be performed by two or more elements, and one function of one element may be performed by two or more elements. Furthermore, two or more functions of two or more elements may be performed by one element, and one function performed by two or more elements may be performed by one element. Furthermore, a part of the configurations of the above-described first through third embodiments may be omitted. At least a part of the configurations of one of the above-described first through third embodiments may be added to or replaced with the configurations of the others of the above-described first through third embodiments.

In addition to the electric work machine, the present disclosure can be embodied in various forms, including a system including the electric work machine, a program to make a computer function as the electric work machine, a non-transitory tangible recording medium, such as a semiconductor memory, storing the program, and a control method of the electric work machine.

What is claimed is:

1. An electric work machine, comprising:
   an output shaft attached to or configured to be attached to a driven equipment;
   a brushless DC motor (i) including a rotor, a first terminal, and a second terminal and (ii) configured to rotationally drive the output shaft, the first terminal and the second terminal being configured to draw a drive current to the brushless DC motor and draw the drive current from the brushless DC motor to rotate the brushless DC motor;
   a first positive-side conduction path configured to electrically connect a positive electrode of a DC power source to the first terminal to deliver the drive current from the positive electrode to the first terminal;
   a first negative-side conduction path configured to electrically connect a negative electrode of the DC power source to the second terminal to deliver the drive current to the negative electrode from the second terminal;
   a first switch device (i) on the first positive-side conduction path or the first negative-side conduction path and (ii) configured to complete or interrupt the first positive-side conduction path or the first negative-side conduction path;
   a manual switch configured to (i) receive a manual operation from a user of the electric work machine and (ii) generate an input signal, the input signal indicating an input variable, and the input variable varying according to the manual operation;
   a rotation sensor configured to output a rotation angle signal corresponding to a rotation angle of the rotor; and
   a controller configured to:
   set a target rotational frequency of the brushless DC motor based on the input variable,
   detect (i) the rotation angle of the rotor and (ii) an actual rotational frequency of the brushless DC motor based on the rotation angle signal,
   drive the first switch device while the rotation angle of the rotor is within a conduction angle, and
   control a magnitude of the conduction angle based on the actual rotational frequency and the target rotational frequency.

2. The electric work machine according to claim 1, wherein the controller is configured to output a pulse width modulated signal to the first switch device while the rotation angle of the rotor is within the conduction angle.

3. The electric work machine according to claim 2, wherein the controller is configured to:
   set a target duty ratio of the pulse width modulated signal based on the input variable, and
   set an actual duty ratio of the pulse width modulated signal based on the target duty ratio.

4. The electric work machine according to claim 3, wherein the controller is configured to increase the target rotational frequency and the target duty ratio in accordance with an increase in the input variable.

5. The electric work machine according to claim 4, wherein the manual switch is configured to be moved by the user, and
   the input variable increases in accordance with an increase in a movement of the manual switch.

6. The electric work machine according to claim 3, wherein the controller is configured to increase the target duty ratio in accordance with an increase in a manually operated parameter while the manually operated parameter is less than a threshold, and
   wherein the manually operated parameter varies based on the input variable.

7. The electric work machine according to claim 3, wherein the controller is configured to set the target duty ratio to 100% while a manually operated parameter is equal to or more than a threshold, and
   wherein the manually operated parameter varies based on the input variable.

8. The electric work machine according to claim 3, wherein the controller is configured to gradually increase the actual duty ratio to the target duty ratio.

9. The electric work machine according to claim 2, wherein the controller is configured to:
   set an initial value of a target duty ratio of the pulse width modulated signal to 100% in response to the manual switch being manually operated or having been manually operated, and
   set an actual duty ratio of the pulse width modulated signal based on the target duty ratio.

10. The electric work machine according to claim 1, wherein the controller is configured to control the magnitude of the conduction angle while the rotor is rotating by a preset angle.

11. The electric work machine according to claim 1, wherein the controller is configured to:

increase the magnitude of the conduction angle to an upper limit of the magnitude until the actual rotational frequency reaches the target rotational frequency, reduce the magnitude of the conduction angle in response to the actual rotational frequency having reached the target rotational frequency, and maintain the actual rotational frequency at the target rotational frequency.

12. The electric work machine according to claim 1, further comprising:

a second switch device (i) on the first positive-side conduction path without the first switch device and configured to complete or interrupt the first positive-side conduction path, or (ii) on the first negative-side conduction path without the first switch device and configured to complete or interrupt the first negative-side conduction path.

13. The electric work machine according to claim 12, wherein the controller is configured to drive the first switch device and the second switch device while the rotation angle of the rotor is within the conduction angle.

14. The electric work machine according to claim 1, wherein the manual switch includes:

a trigger configured to be pulled by the user; and/or a rotary dial configured to be rotated by the user, and wherein the input variable varies according to a pulled distance of the trigger and/or a rotation angle of the rotary dial.

15. The electric work machine according to claim 14, wherein the controller is configured to set the target rotational frequency based on (i) the pulled distance of the trigger and/or (ii) the rotation angle of the rotary dial.

16. The electric work machine according to claim 14, wherein the controller is configured to:

output a pulse width modulated signal to the first switch device while the rotation angle of the rotor is within the conduction angle, set a target duty ratio of the pulse width modulated signal based on (i) the pulled distance of the trigger and/or (ii) the rotation angle of the rotary dial, and set an actual duty ratio of the pulse width modulated signal based on the target duty ratio.

17. The electric work machine according to claim 1, wherein the brushless DC motor is in the form of a three-phase brushless DC motor.

18. A method of controlling a brushless DC motor of an electric work machine, the method comprising:

detecting (i) a rotation angle of a rotor of the brushless DC motor and (ii) an actual rotational frequency of the brushless DC motor;

driving a switch device of the electric work machine while the rotation angle of the rotor is within a conduction angle; and controlling a magnitude of the conduction angle based on the actual rotational frequency and a target rotational frequency.

* * * * *